United States Patent
Jenkins et al.

(10) Patent No.: US 7,627,245 B2
(45) Date of Patent: Dec. 1, 2009

(54) SYSTEM AND METHOD FOR RE-USING WAVELENGTHS IN AN OPTICAL NETWORK

(75) Inventors: David W. Jenkins, North Aurora, IL (US); Mark E. Boduch, Geneva, IL (US)

(73) Assignee: Tellabs Operations, Inc., Naperville, IL (US)

(*) Notice: Subject to any disclaimer, the term of this patent is extended or adjusted under 35 U.S.C. 154(b) by 425 days.

(21) Appl. No.: 11/227,308

(22) Filed: Sep. 15, 2005

(65) Prior Publication Data

US 2006/0133807 A1    Jun. 22, 2006

Related U.S. Application Data

(60) Provisional application No. 60/636,706, filed on Dec. 16, 2004.

(51) Int. Cl.
*H04J 14/02*    (2006.01)

(52) U.S. Cl. .................................. 398/57; 398/83

(58) Field of Classification Search .................. 398/48, 398/57, 83
See application file for complete search history.

(56) References Cited

U.S. PATENT DOCUMENTS

| | | | |
|---|---|---|---|
| 5,351,146 A | 9/1994 | Chan et al. | |
| 5,774,244 A | 6/1998 | Tandon et al. | |
| 6,038,044 A * | 3/2000 | Fee et al. | 398/56 |
| 6,154,296 A * | 11/2000 | Elahmadi et al. | 398/83 |
| 6,295,146 B1 | 9/2001 | Nathan et al. | |
| 7,161,898 B1 * | 1/2007 | Mazzurco et al. | 370/217 |
| 2002/0067883 A1 | 6/2002 | Lo | |
| 2002/0196490 A1 * | 12/2002 | Smith | 359/118 |
| 2003/0156317 A1 | 8/2003 | Ruhl et al. | |
| 2004/0120711 A1 * | 6/2004 | Elbers et al. | 398/41 |
| 2004/0208573 A1 | 10/2004 | Gumaste | |
| 2004/0208574 A1 | 10/2004 | Gumaste | |
| 2004/0218921 A1 * | 11/2004 | Kuroyanagi et al. | 398/56 |
| 2006/0110162 A1 * | 5/2006 | Tian et al. | 398/83 |

FOREIGN PATENT DOCUMENTS

| | | |
|---|---|---|
| EP | 0 677 935 A1 | 10/1995 |
| EP | 0 716 521 A2 | 6/1996 |
| EP | 0 907 266 A2 | 4/1999 |
| EP | 1 659 724 A2 | 5/2006 |

(Continued)

OTHER PUBLICATIONS

Medova, E.A., "Optimal Design of Reconfigurable Ring Multiwavelength Networks," *The Iinstitution of Electrical Engineers*, IEE, Savoy Place, London WC2R UK, the whole document, (1993).

(Continued)

*Primary Examiner*—Nathan M Curs
(74) *Attorney, Agent, or Firm*—Hamilton, Brook, Smith & Reynolds, P.C.

(57) ABSTRACT

A network design that reduces the number of wavelengths needed to support communications in a Wavelength Division Multiplexing (WDM) network is disclosed. Wavelengths are reused in isolated sub-networks that do not share common network paths, allowing for the reduction in cost of the WDM equipment supporting the communications in the network.

22 Claims, 17 Drawing Sheets

FOREIGN PATENT DOCUMENTS

| JP | 06-104845 A | 4/1994 |
|---|---|---|
| WO | WO 03/104849 A2 | 12/2003 |

OTHER PUBLICATIONS

Wuttisittikulkij, L., et al., "Design of a WDM network using a Multiple Ring Approach," XP-10254659A, 0-7803-4198-8, IEEE 1997, the whole document.

Lee, A.S.T., etal., "Heuristic for Setting up a Stack of WDM Rings with Wavelength Reuse," *Journal of Lightwave Technology*, XP-2378138A, vol. 18, No. 4, pp. 521-529, Apr. 2000, the whole document.

Toba, H., et al. "Demonstration of Optical FDM Based Self-Healing Ring Network Employing Arrayed-Waveguide-Grating ADM Filters And EDFAs," *Proceedings of the 20$^{th}$ European Conference on Optical Communication (ECOC)* Firenze, Italy, vol. 1, Sep. 25-29, 1994, pp. 263-266.

"Product Bulletin: Integrated PLC Reconfigurable Optical Add/Drop Multiplexer," JDS Uniphase, 2006.

"Introduction to DWDM for Metropolitan Networks," Cisco Systems, http://cisco.com/univercd/cc/td/doc/product/mels/1500/ian__2001/index.htm,, Jan. 2001.

"Sonet Telecommunications Standard Primer," Tektronix, http://tek.com/Measurement/App__Notes/SONET/ZRW-11407-2.pdf., 2001.

* cited by examiner

SYSTEM AND METHOD FOR RE-USING WAVELENGTHS IN AN OPTICAL NETWORK

RELATED APPLICATION

This application claims the benefit of U.S. Provisional Application No. 60/636,706 filed on Dec. 16, 2004. The entire teachings of the above application are incorporated herein by reference.

BACKGROUND OF THE INVENTION

Wavelength Division Multiplexing (WDM) is a method by which single-mode optical fibers are used to carry multiple light waves of different frequencies. In a WDM network many wavelengths are combined in a single fiber, thus increasing the carrying capacity of the fiber. Signals are assigned to specific frequencies of light (wavelengths) within a frequency band. This multiplexing of optical wavelengths is analogous to the way radio stations broadcast on different wavelengths as to not interfere with each other. Because each channel is transmitted on a different wavelength, a desired channel may be selected using a tuner. WDM channels (wavelengths) are selected in a similar manner. In a WDM network, all wavelengths are transmitted through a fiber, and demultiplexed at a receiving end. The fiber's capacity is an aggregate of the transmitted wavelengths, each wavelength having its own dedicated bandwidth.

Dense Wavelength Division Multiplexing (WDM) is a WDM network in which wavelengths are spaced more closely than in a coarse WDM network. This provides for a greater overall capacity of the fiber.

WDM may be used with dedicated protection techniques such as a Unidirectional Path Switched Ring (UPSR) in a Synchronous Optical Network (SONET). Such a dedicated protection technique uses dual counter-rotating rings that form bi-directional connections between the nodes of the network. A fully protected bi-directional connection between any two nodes may be established and dedicated to a particular wavelength. A working wavelength travels in one direction, and a protection wavelength travels in the opposite direction. The working wavelength typically takes a shorter path between the two nodes while the protection wavelength takes a longer path. The frequency of the working and protection wavelengths may be identical, as they travel in opposite directions. Every section of the dual counter-rotating rings are occupied by either the working wavelength or the protection wavelength (a section may be defined as the fibers directly connecting two nodes within a ring). Therefore, the working wavelength and the protection wavelength cannot be used to establish any additional connections between any other two nodes. Additional connections require the use of additional wavelengths.

It should be noted that WDM equipment within a given WDM node can only support a finite number of wavelengths; therefore, there is often an economic benefit associated with limiting the number of wavelengths used when designing a WDM network.

SUMMARY OF THE INVENTION

An embodiment of the present invention includes a network, or corresponding method, with at least four network nodes that are each coupled to at least three network paths. At least two of the at least three network paths couple the network nodes. The network also includes at least two sub-networks that each include at least two of the network nodes and use at least one wavelength in common with the other sub-network.

Another embodiment of the present invention includes a network, or corresponding method, with (i) at least one network node coupled to at least four network paths and (ii) at least two sub-networks each including the at least one network node and using at least one wavelength in common.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

According to some embodiments of the present invention, a total number of wavelengths used in a WDM network may be reduced by designing a network using multi-degree nodes that form multiple sub-networks. Isolated sub-networks that do not share common network paths may reuse the same wavelengths used for communications within the other sub-networks.

An embodiment of the present invention includes a network, or corresponding method, with at least four network nodes that are each coupled to at least three network paths. At least two of the at least three network paths couple the network nodes. The network also includes at least two sub-networks that each include at least two of the network nodes and use at least one wavelength in common with the other sub-network.

The sub-networks may use at least one wavelength, in addition to the at least one wavelength in common, that supports communications between the nodes of different sub-networks. The sub-networks may be ring networks, mesh networks, or a combination thereof.

The network may include at least four network paths that couple the network nodes and define a third sub-network. Additional sub-networks may be defined with an addition of an even number of network paths. The network paths may themselves include multiple network nodes or sub-networks.

The network nodes may be reconfigurable; that is, they may be used to selectively reconfigure the optical interconnections associated with the network paths. This reconfiguration may be in the optical domain and may be achieved through the use of Reconfigurable Optical Add/Drop Multiplexers (ROADMs). Additionally, the nodes of the network may include add/drop ports that are used for adding or dropping wavelengths to and from the network.

A network path carries a data stream between network nodes and may be a single fiber for uni-directional traffic or multiple fibers for bi-directional communications.

Details of the network embodiments described above are presented below in reference to FIGS. 5 and 13-18. FIGS. 1-4 and 6-12 illustrate embodiments of nodes, add/drop multiplexers, and network protection techniques (e.g., Unidirectional Path Switched Ring (UPSR)) useful for understanding aspects of the present invention.

Figure 1:
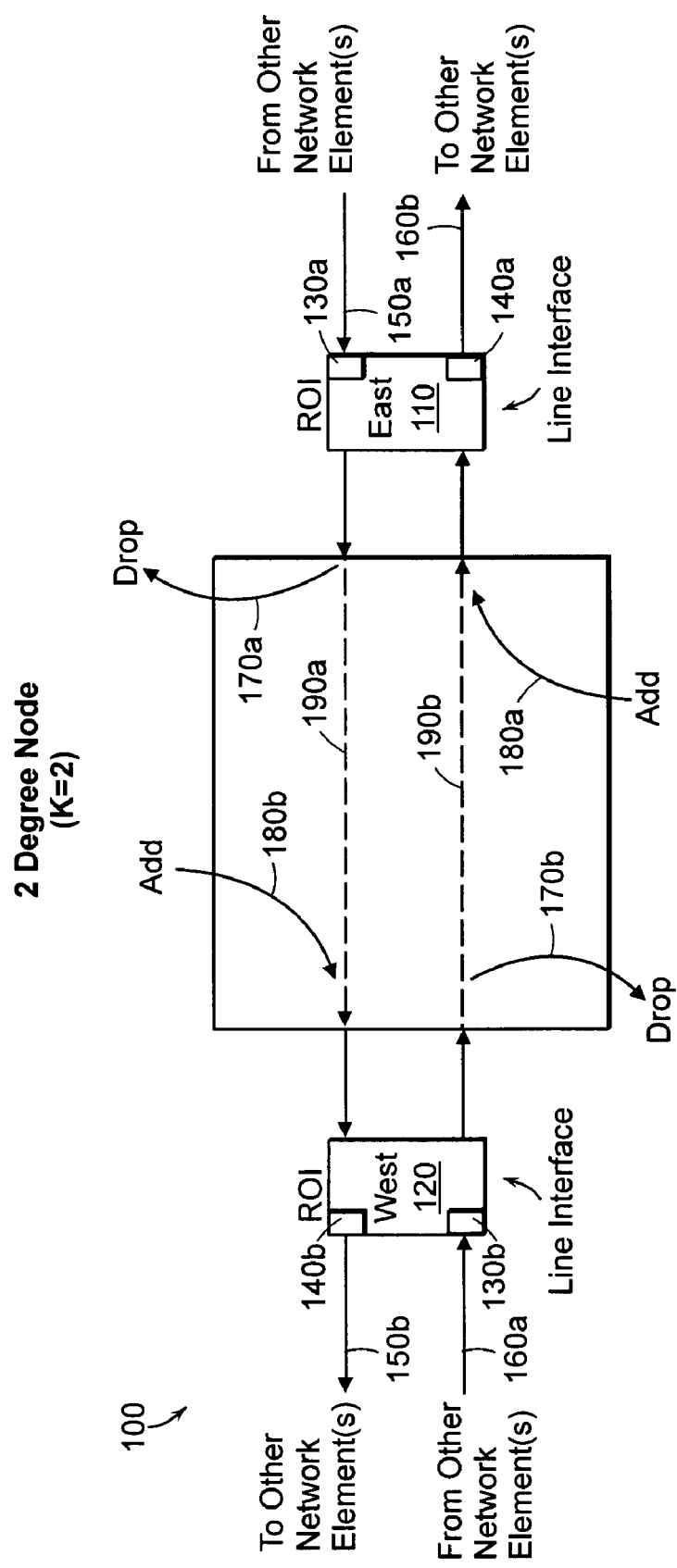
FIG. 1 is a logical view of a reconfigurable, 2-degree, optical, add/drop node according to an embodiment of the present invention.

FIG. 1 illustrates a logical view of a reconfigurable, 2-degree, optical, add/drop node 100 according to an embodiment of the present invention. The node 100 includes two reconfigurable optical interfaces (ROIs). The ROIs are labeled East 110 and West 120 in FIG. 1. Each ROI includes a multi-wavelength input port 130a, 130b and a multi-wavelength output port 140a, 140b. According to one embodiment, the multi-wavelength ports transport multiple wavelengths over single fibers 150a, 150b and 160a, 160b by using wavelength division multiplexing (WDM) techniques.

According to an embodiment of the present invention, add and drop ports (not shown) are associated with each ROI. Multiple wavelengths may be dropped at a given ROI. When wavelengths are dropped, each dropped wavelength is placed on an individual fiber 170a, 170b. It should be appreciated that the single line 170a, 170b in FIG. 1 used to show drops may represent multiple individual fibers. When wavelengths are added, each added wavelength is received on an individual fiber 180a, 180b. It should be appreciated that the single line 180a, 180b in FIG. 1 used to show adds may represent multiple individual fibers.

A wavelength (λ) arriving on the multi-wavelength input port 130a, 130b of a given ROI 110, 120 may be directed to either the associated drop port 170a, 170b or may be passed-through to the multi-wavelength output port 140b, 140a of the other ROI 120, 110. Pass-through channels 190a, 190b are illustrated in FIG. 1 by the dashed lines. Because the node in FIG. 1 has two ROIs, it may be referred to as a 2-degree node (i.e., K=2).

Figure 2:
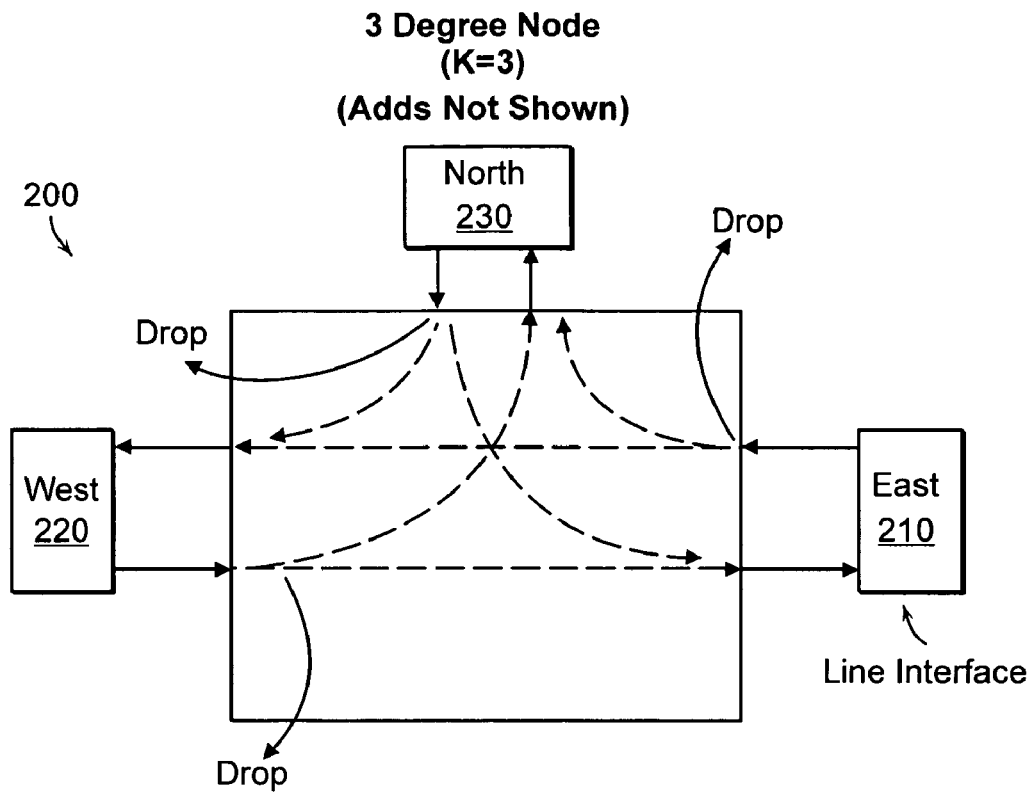
FIG. 2 is a logical view of a reconfigurable, 3-degree, optical, add/drop node according to an embodiment of the present invention.

FIG. 2 illustrates a logical view of a 3-degree node (i.e., K=3) 200. ROIs 210, 220, and 230 are labeled East, West, and North, respectively. For this node 200, a wavelength (λ) arriving on the multi-wavelength input port of a given ROI may be directed to either the associated drop port or may be passed-through to the multi-wavelength output ports of either of the two other ROIs, as indicated in FIG. 2.

Figure 3:
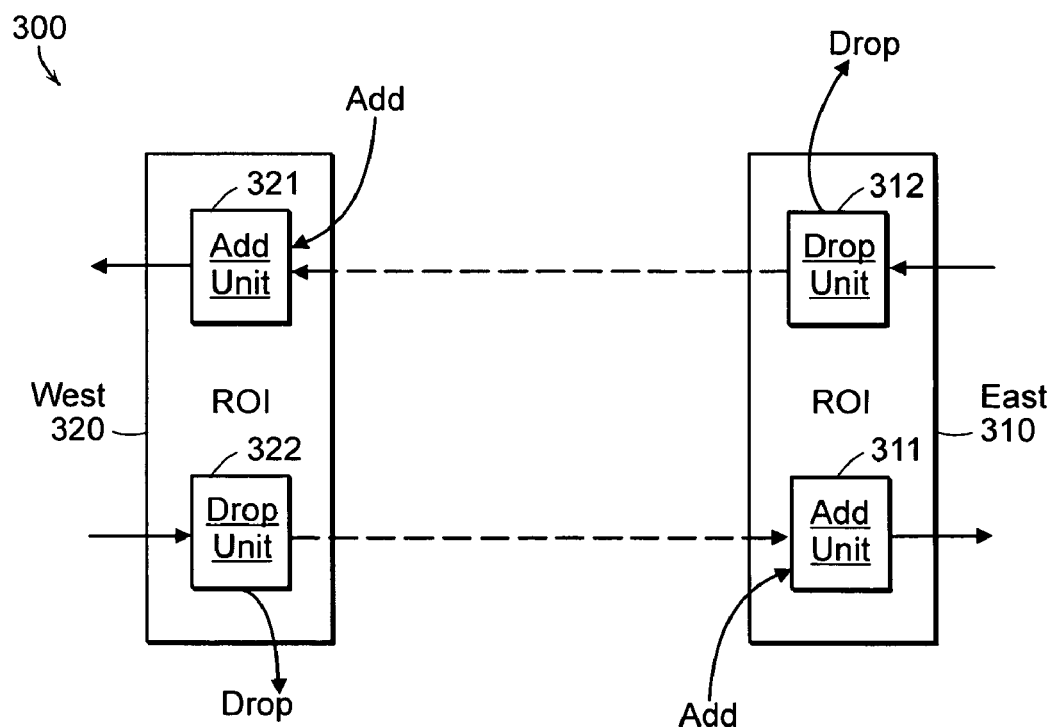
FIG. 3 is a physical perspective of a reconfigurable, 2-degree, optical, add/drop node.

FIG. 3 illustrates a physical perspective of a node 300. The node 300 includes two ROIs 310, 320. The node 300 may be implemented as the node 100 shown in FIG. 1. As shown, add units 311 and 321 may be used to add wavelengths to multi-wavelength output ports. At a given ROI 310, these wavelengths can come from either the add ports or from the drop unit 322 of the other ROI 320, as indicated. Drop units 312 and 322 may be used to drop wavelengths to individual fibers of an associated drop port. At a given ROI 310, these wavelengths may come from the multi-wavelength input port associated with the given ROI 310.

Figure 4:
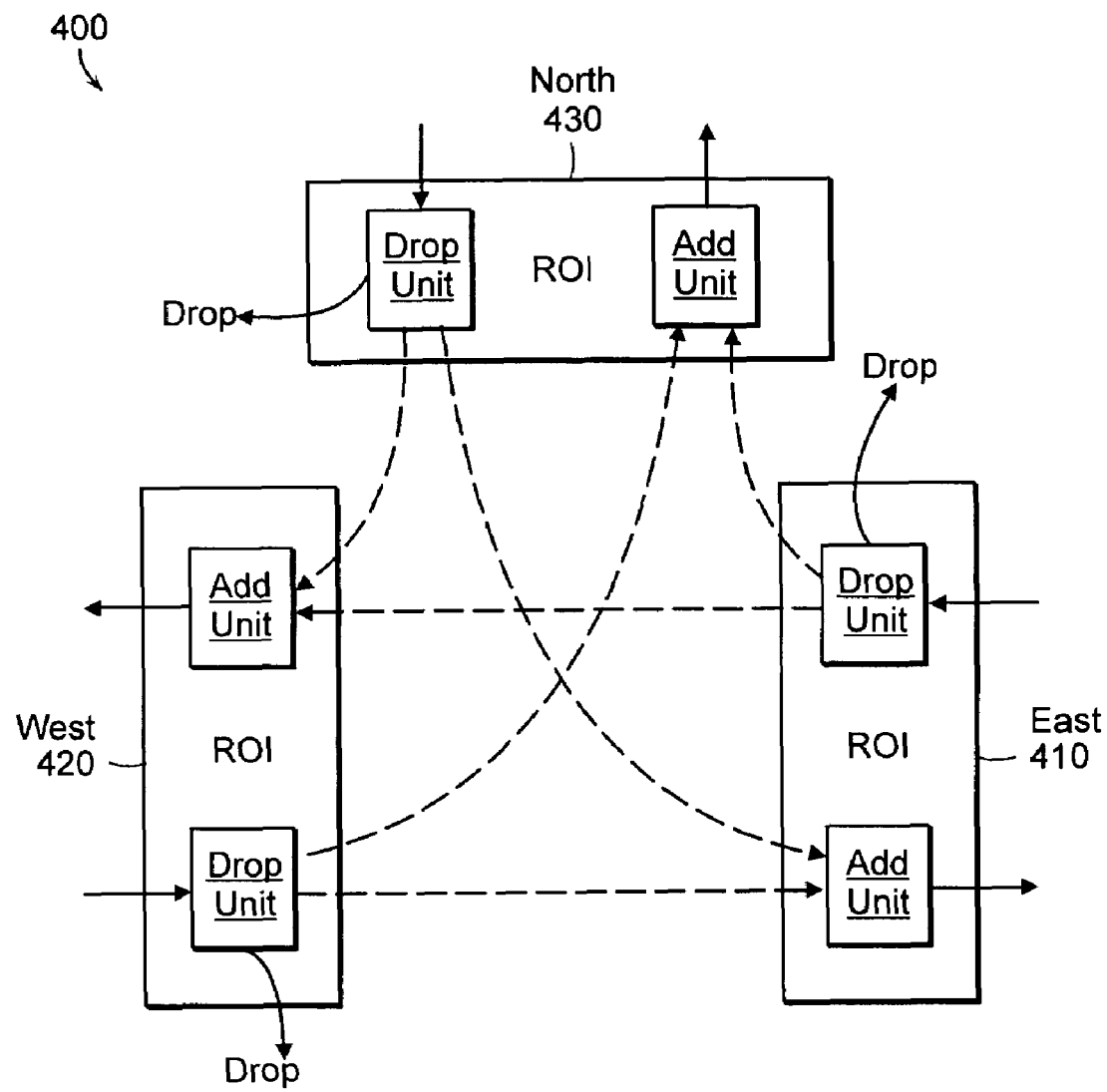
FIG. 4 is a physical perspective of a reconfigurable, 3-degree, optical, add/drop node.

FIG. 4 illustrates a physical perspective of a node 400. The node 400 includes three ROIs 410, 420, and 430. The node 400 may be implemented as the node 200 shown in FIG. 2 and operate in a similar manner as the 2-degree node 300 described in reference to FIG. 3.

Figure 5:
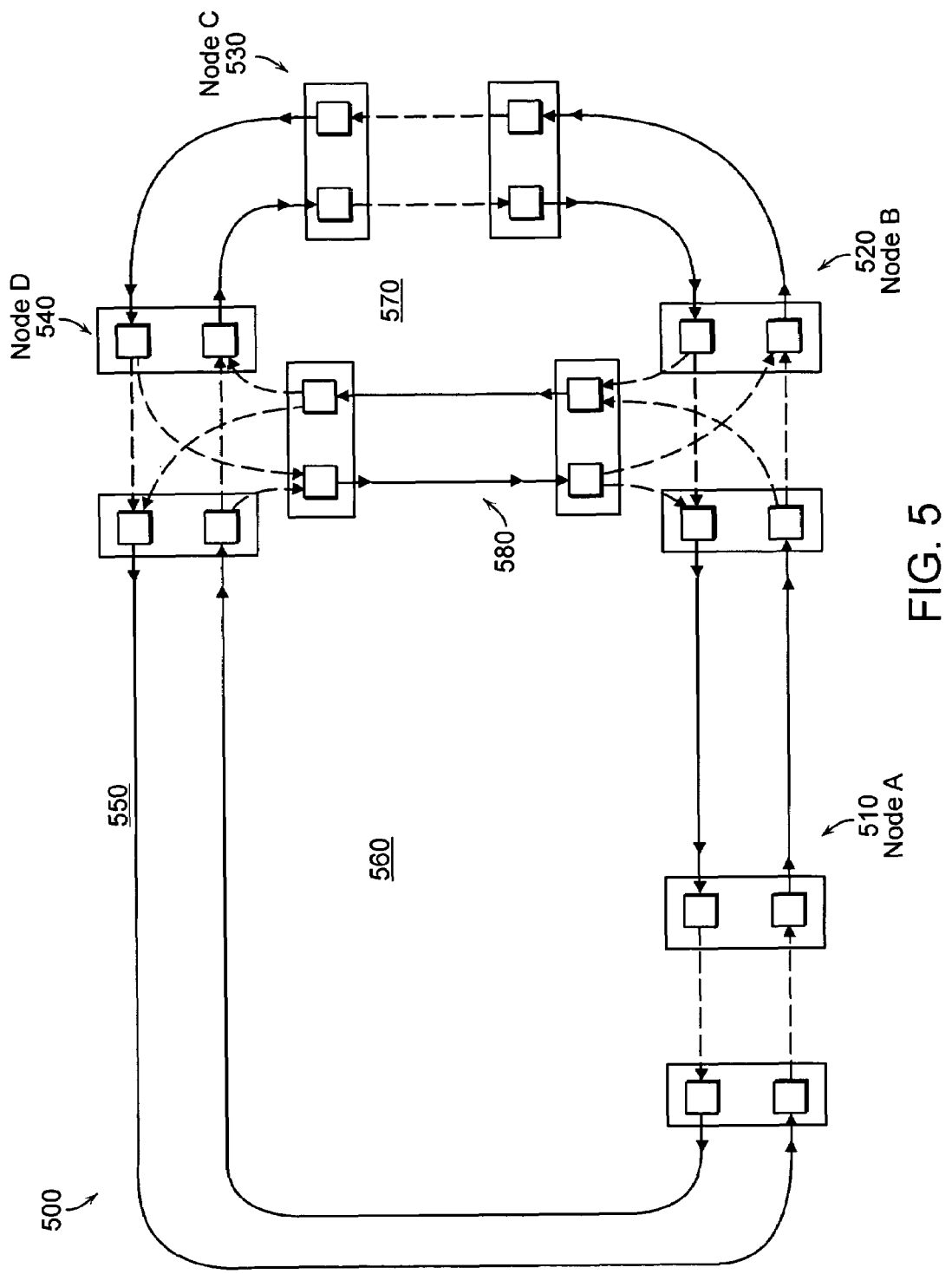
FIG. 5 is a network diagram of a multi-ring design using 2-degree nodes and 3-degree nodes.

FIG. 5 illustrates a multi-ring design 500 using 2-degree nodes and 3-degree nodes. Nodes A 510 and C 530 are 2-degree nodes. Nodes B 520 and D 540 are 3-degree nodes. As shown, there are three distinct rings, referred to as Ring 1 550, Ring 2 560, and Ring 3 570. Ring 1 includes nodes A, B, C, and D. Ring 2 includes nodes A, B, and D. Ring 3 includes nodes B, C and D. The rings 550, 560, 570 share some common paths (or ring sections). For instance, Ring 2 and Ring 3 share a path between nodes B and D. According to one embodiment, this implies that the wavelengths used within Ring 2 must be different from the wavelengths used within Ring 3, since all the wavelengths of both of these rings are placed on the same path 580 (i.e., fiber that runs between nodes B and D). According to one aspect of this embodiment, this assumes the use of a dedicated fiber optical protection technique such as UPSR.

Figure 6:
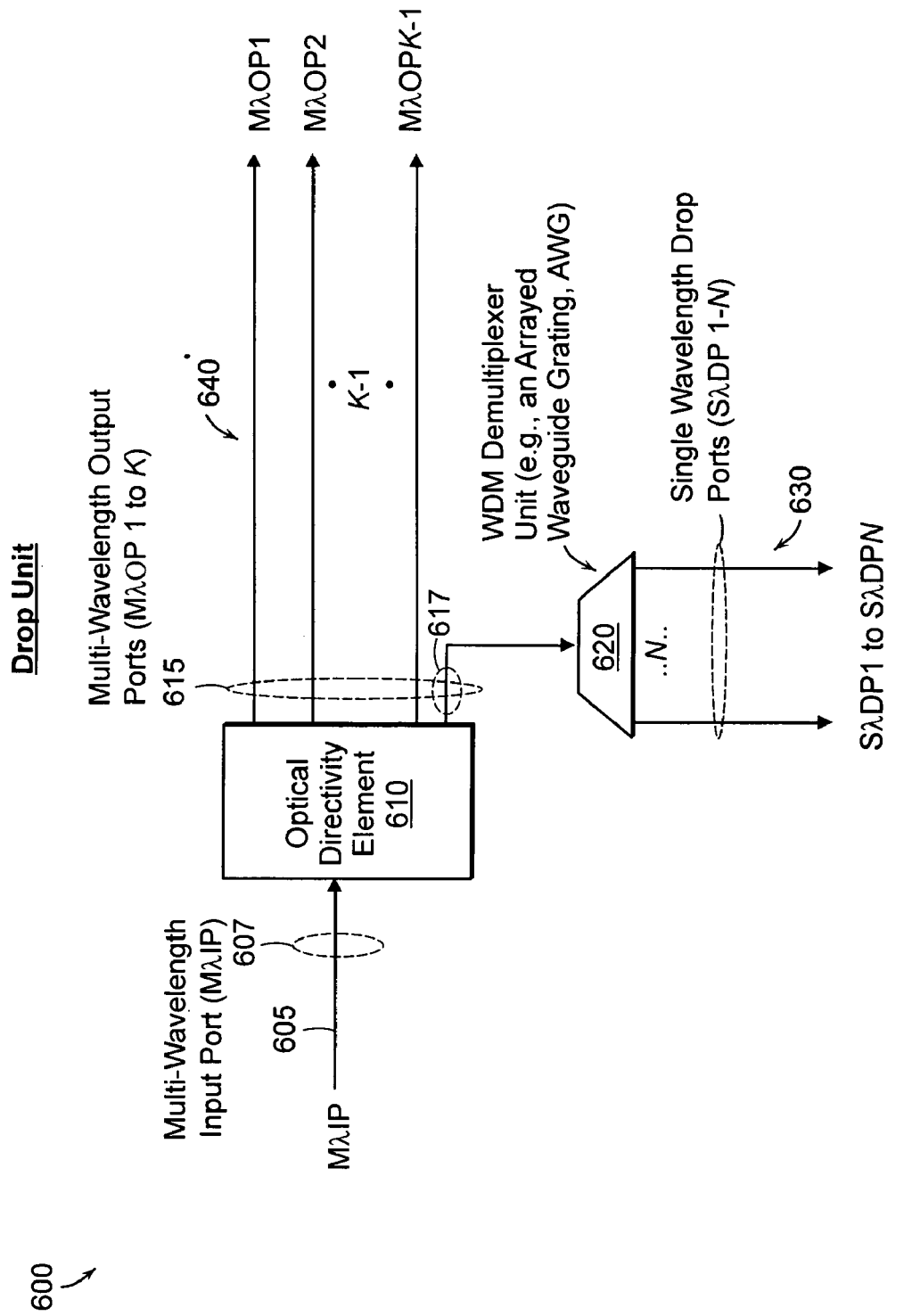
FIG. 6 is a block diagram of a drop unit according to an embodiment of the present invention.

FIG. 6 illustrates a drop unit 600 according to an embodiment of the present invention. The drop unit 600 may be implemented as one of the drop units illustrated in FIGS. 3 and 4. The optical directivity element 610 may be used to direct wavelengths (MλIP) arriving via a fiber 605 on the multi-wavelength input port 607 to its various multi-wavelength output ports 615. This may be achieved through the utilization of optical switches, optical couplers, or other appropriate technologies (not shown). The wavelengths exiting the lower multi-wavelength output port 617 of the optical directivity element 610 are sent to a WDM de-multiplexer 620. The WDM de-multiplexer 620 de-multiplexes the WDM signal into its individual wavelengths (SλDP1-SλDPN) and directs each wavelength to a specific individual fiber. Because there are N possible wavelengths carried within the multi-wavelength ports, the de-multiplexer 620 supports up to N "drop" fibers 630. Wavelengths (MλOP1-MλOPK-1) that are not dropped may be directed via output fibers 640 to one or more of the other multi-wavelength output ports 615 on the drop unit 600.

Figure 7:
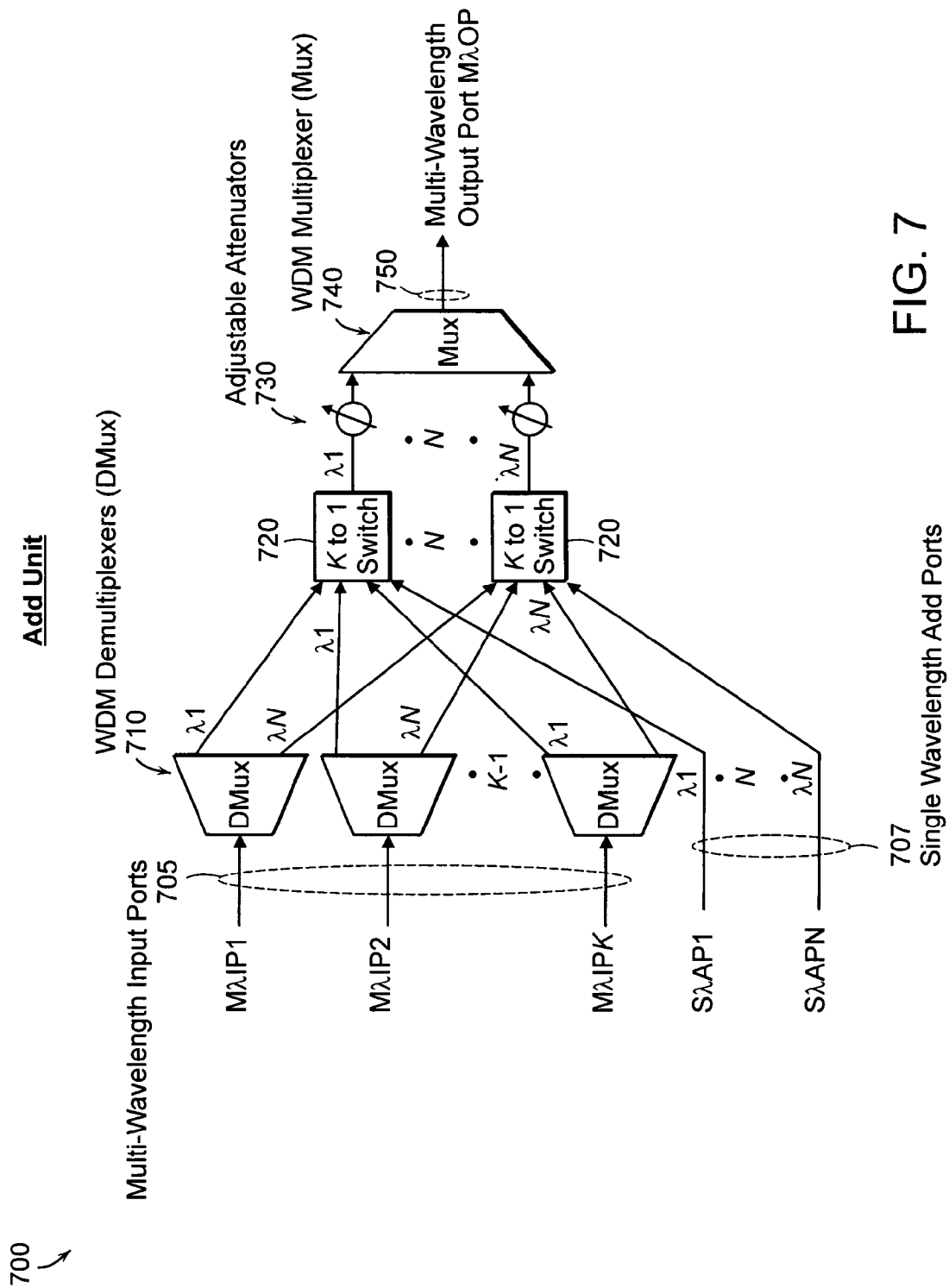
FIG. 7 is a block diagram of an add unit according to an embodiment of the present invention.

FIG. 7 illustrates an add unit 700 according to an embodiment of the present invention. The add unit 700 may be implemented as one of the add units illustrated in FIGS. 3 and 4. A set of WDM de-multiplexers 710 (such as an Arrayed Waveguide Grating (AWG)) are used to de-multiplex the wavelengths (MλIP1- MλIPK) arriving on multi-wavelength input ports 705 into individual wavelengths (λ1-λN). The wavelengths are then sent to a set of N K-to-1 optical switches 720. In some embodiments, there is one switch associated with each of the N wavelengths. Therefore, the source of a given wavelength on a multi-wavelength output port 750 of a WDM multiplexer (MUX) 740 can come from any of the K-1 multi-wavelength input ports 705 or from the individual single wavelength add ports 707, as shown. Once the switches select a given wavelength, the selected wavelengths can be "power balanced" via the set of N adjustable attenuators 730.

Figure 8:
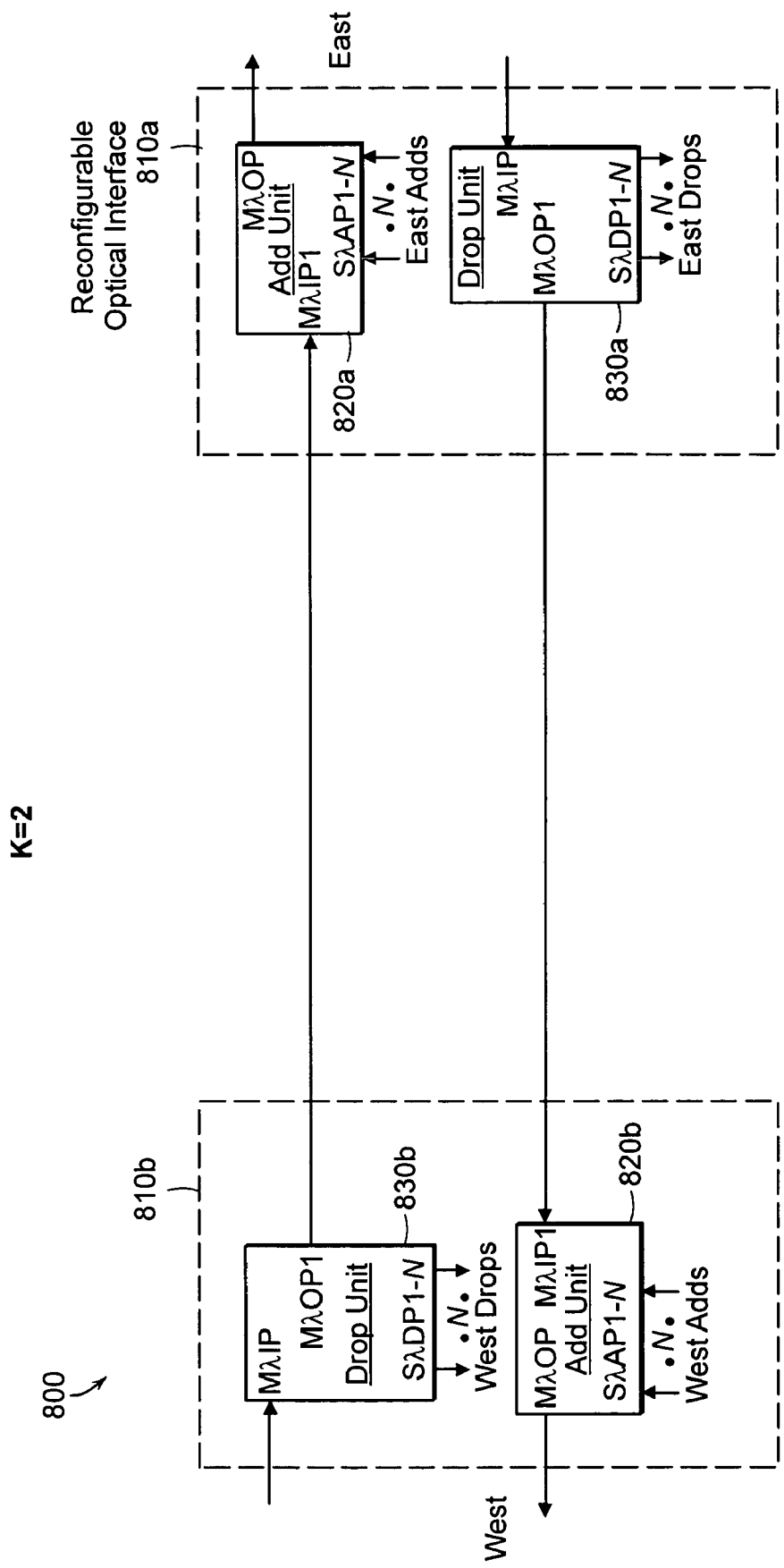
FIG. 8 is a block diagram of a 2-degree node with two, reconfigurable, optical interfaces.

FIG. 8 illustrates a 2-degree node 800 with two ROIs 810*a*, 810*b*, each including both an add unit 820*a*, 820*b* and a drop unit 830*a*, 830*b*.

Figure 9:
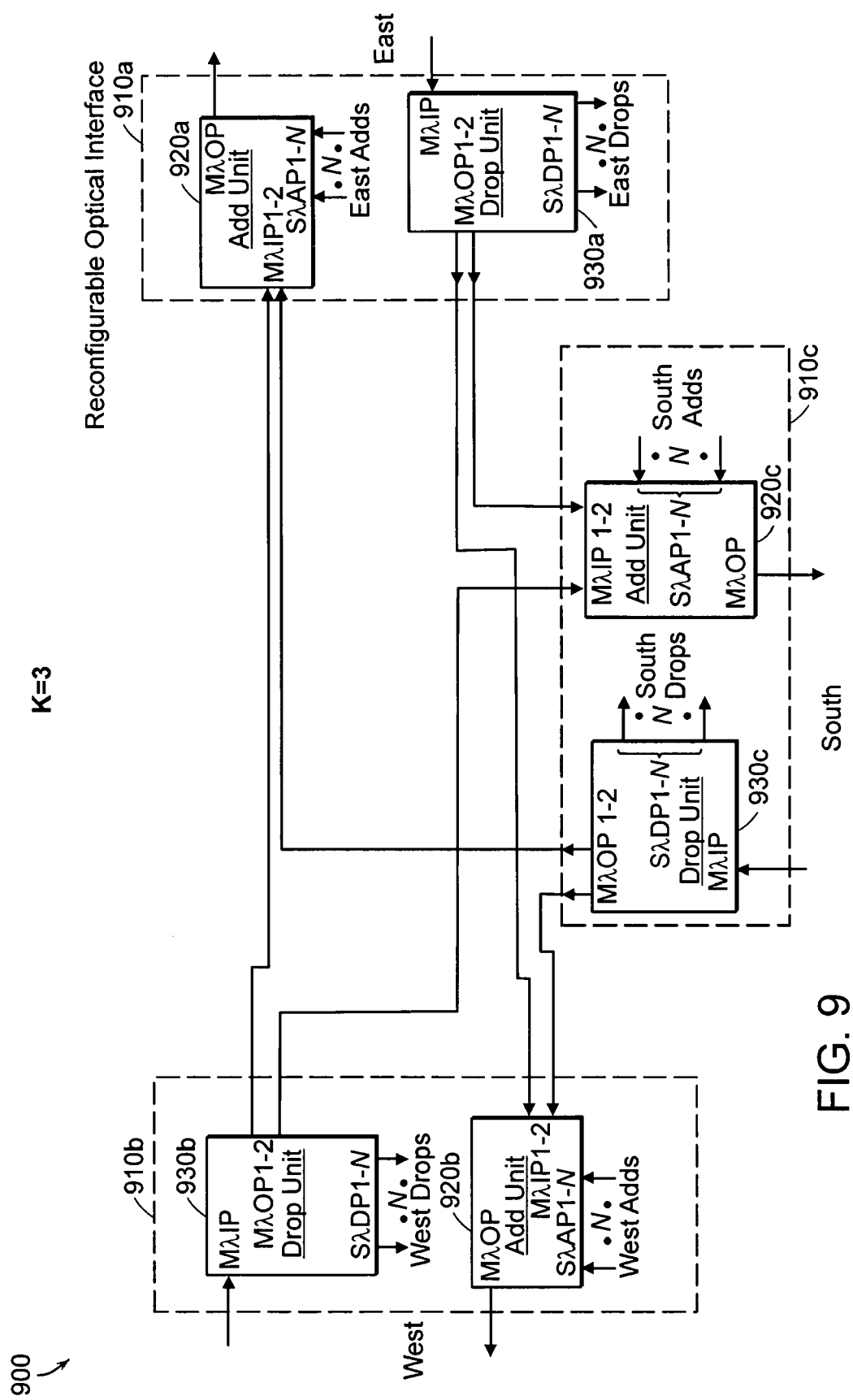
FIG. 9 is a block diagram of a 3-degree node with three, reconfigurable, optical interfaces.

FIG. 9 illustrates a 3-degree node 900 with three ROIs 910*a*, 910*b*, 910*c*, each including both an add unit 920*a*, 920*b*, 920*c* and a drop unit 930*a*, 930*b*, 930*c*.

Figure 10:
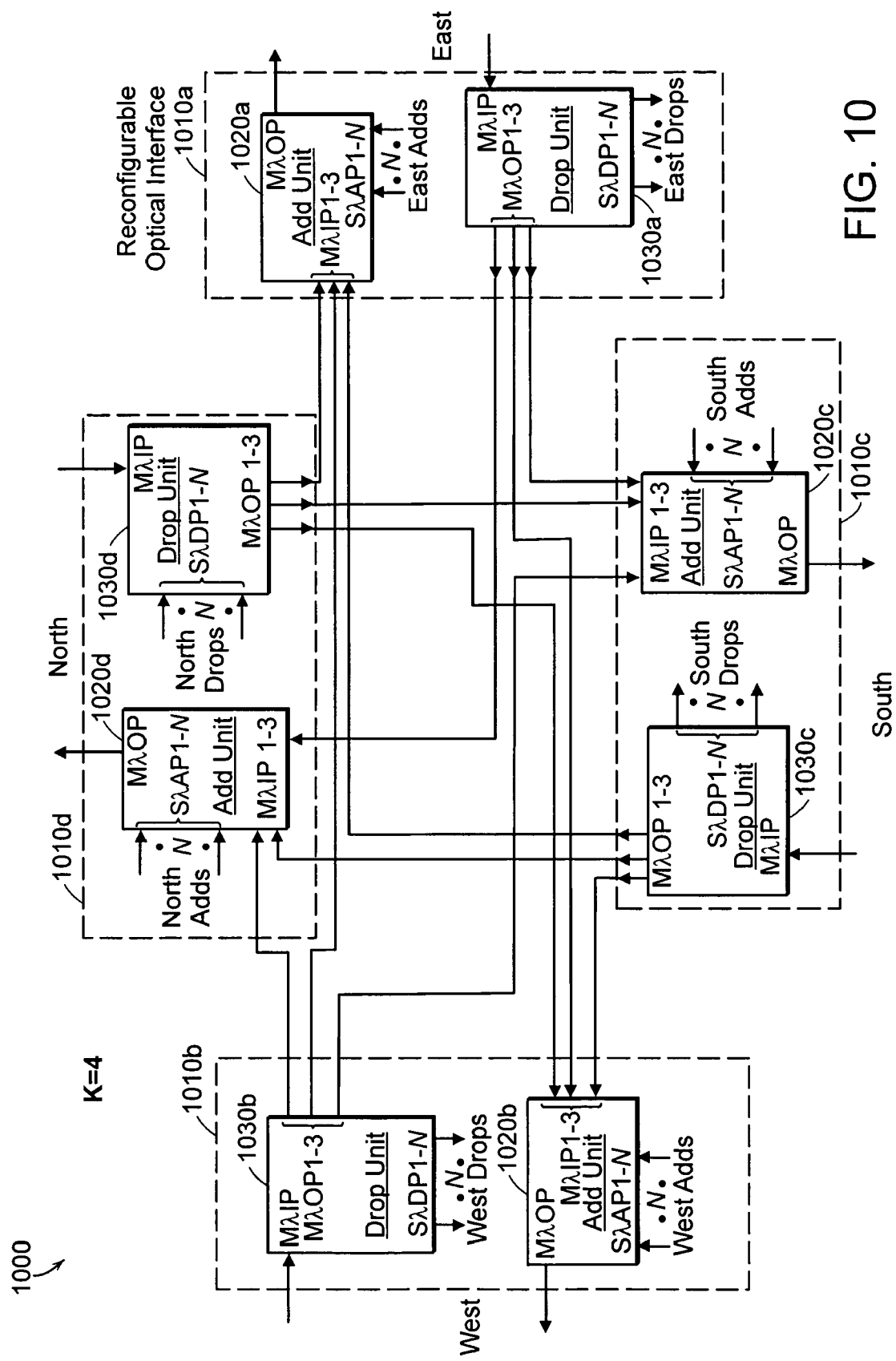
FIG. 10 is a block diagram of a 4-degree node with four, reconfigurable, optical interfaces.

FIG. 10 illustrates a 4-degree node 1000 with four ROIs 1010*a*, 1010*b*, 1010*c*, 1010*d*, each including both an add unit 1020*a*, 1020*b*, 1020*c*, 1020*d* and a drop unit 1030*a*, 1030*b*, 1030*c*, 1030*d*.

Figure 11:
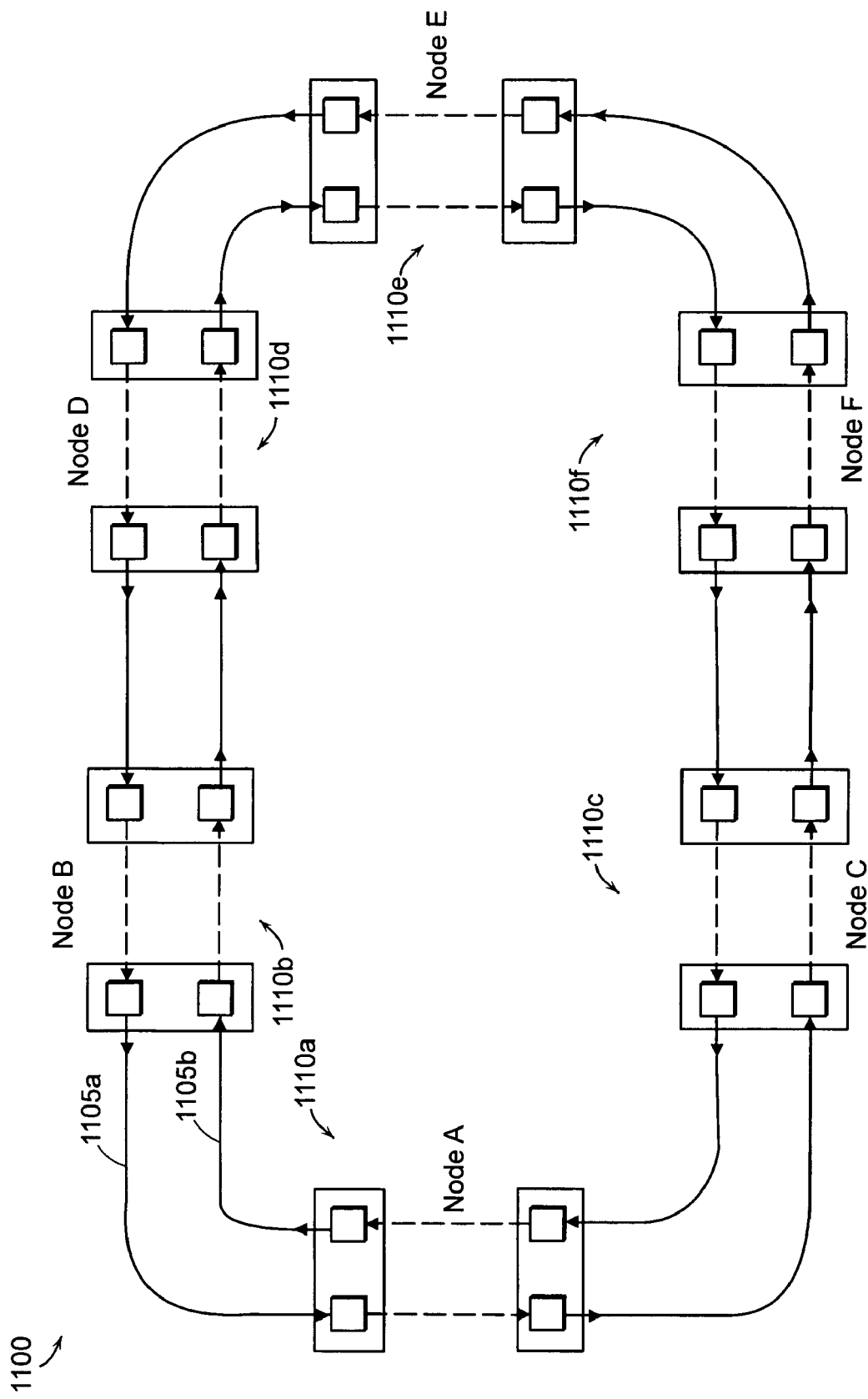
FIG. 11 is a network diagram of a single ring network design utilizing 2-degree nodes.

FIG. 11 illustrates a single ring network design 1100 utilizing 2-degree nodes 1110*a-f*. The network 1100 includes dual "counter-rotating" rings 1105*a*, 1105*b*. Dual counter rotating rings are used in dedicated protection techniques such as UPSR. A bi-directional connection between two nodes (e.g., nodes 1110*a* and 1110*f*) may be assigned to and dedicated to a WDM wavelength. In this embodiment, both a working wavelength and a protection wavelength may be used to establish a fully protected bi-directional connection between the two nodes. The wavelengths of the working and protection wavelengths may be identical.

Figure 12:
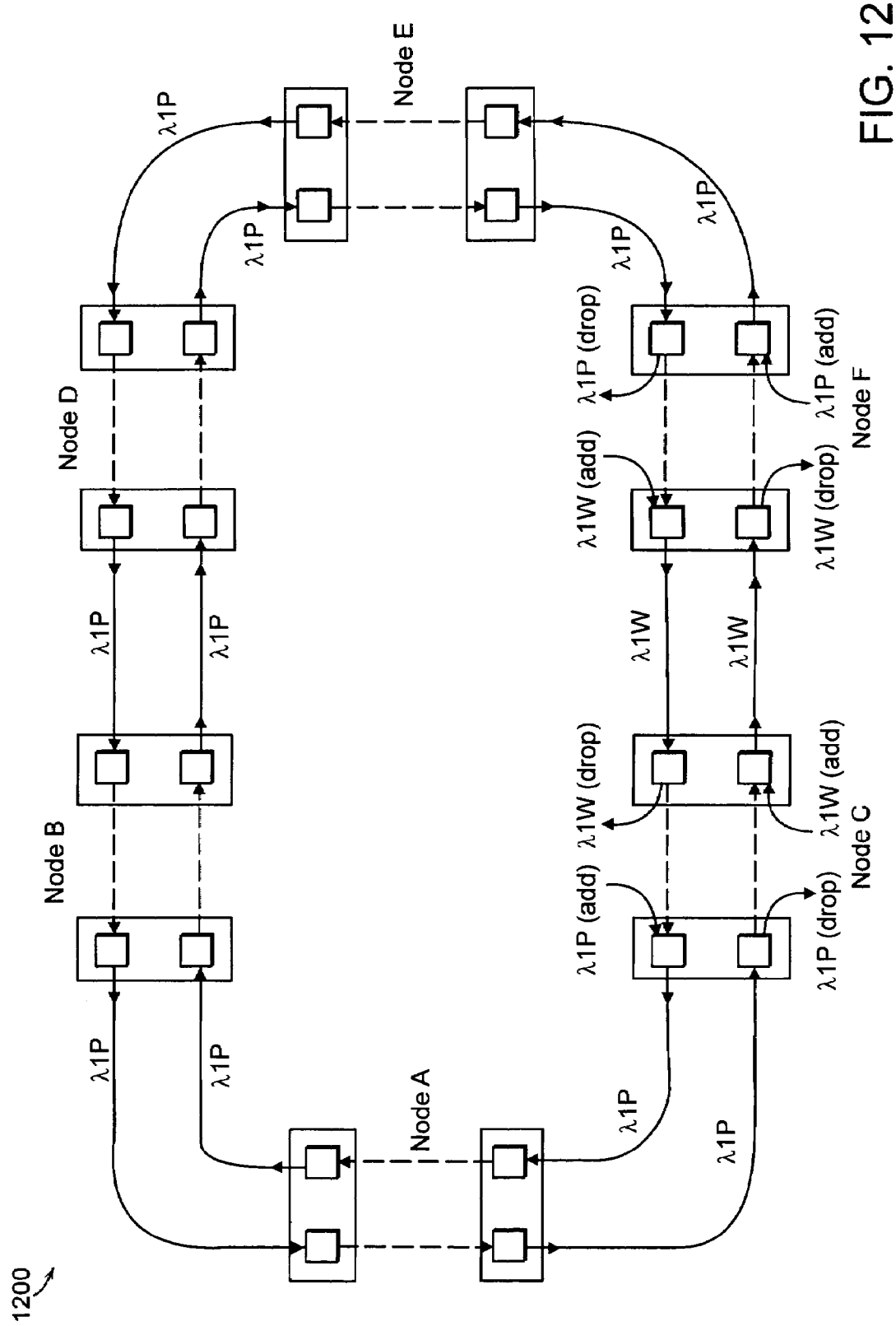
FIG. 12 is a network diagram of a single ring network design utilizing 2-degree nodes where a fully protected bi-directional connection is established between nodes C and F.

FIG. 12 shows an example network having working and protection wavelengths using the same wavelength, where a fully protected bi-directional connection is established between nodes C and F. As illustrated in FIG. 12, the working wavelength $\lambda 1W$ takes a shorter path between the two nodes, while the protection wavelength $\lambda 1P$ takes a longer path. In order to establish this connection, every section of the dual rings are occupied by either the working wavelength or the protection wavelength, where a section may be defined as the two fibers directly connecting two nodes within the ring. Therefore, $\lambda 1W$ and $\lambda 1P$ cannot be used to establish any additional connections between any other two nodes.

WDM equipment within a given WDM node can only support a finite number of wavelengths (e.g., 4 wavelengths, 8 wavelengths, or 12 wavelengths, etc.); therefore, there is often an economic benefit associated with better utilizing the wavelengths used when designing a WDM network. The use of multi-degree nodes within a network may help limit the number of wavelengths utilized in constructing a network and its associated connections. As an example, suppose that a network such as the network 1100 shown in FIG. 11 is used to establish fully protected bidirectional connections between every pair of nodes (e.g., using UPSR protection). As illustrated in Table 1 below, a total of fifteen wavelengths are needed to establish all the connections.

TABLE 1

| Connection | Wavelength Number | Ring |
| --- | --- | --- |
| A-B | $\lambda 1$ | Main Outer Ring |
| A-C | $\lambda 2$ | Main Outer Ring |
| A-D | $\lambda 3$ | Main Outer Ring |
| A-E | $\lambda 4$ | Main Outer Ring |
| A-F | $\lambda 5$ | Main Outer Ring |
| B-C | $\lambda 6$ | Main Outer Ring |
| B-D | $\lambda 7$ | Main Outer Ring |
| B-E | $\lambda 8$ | Main Outer Ring |
| B-F | $\lambda 9$ | Main Outer Ring |
| C-D | $\lambda 10$ | Main Outer Ring |
| C-E | $\lambda 11$ | Main Outer Ring |
| C-F | $\lambda 12$ | Main Outer Ring |
| D-E | $\lambda 13$ | Main Outer Ring |

TABLE 1-continued

| Connection | Wavelength Number | Ring |
| --- | --- | --- |
| D-F | $\lambda 14$ | Main Outer Ring |
| E-F | $\lambda 15$ | Main Outer Ring |

Figure 13:
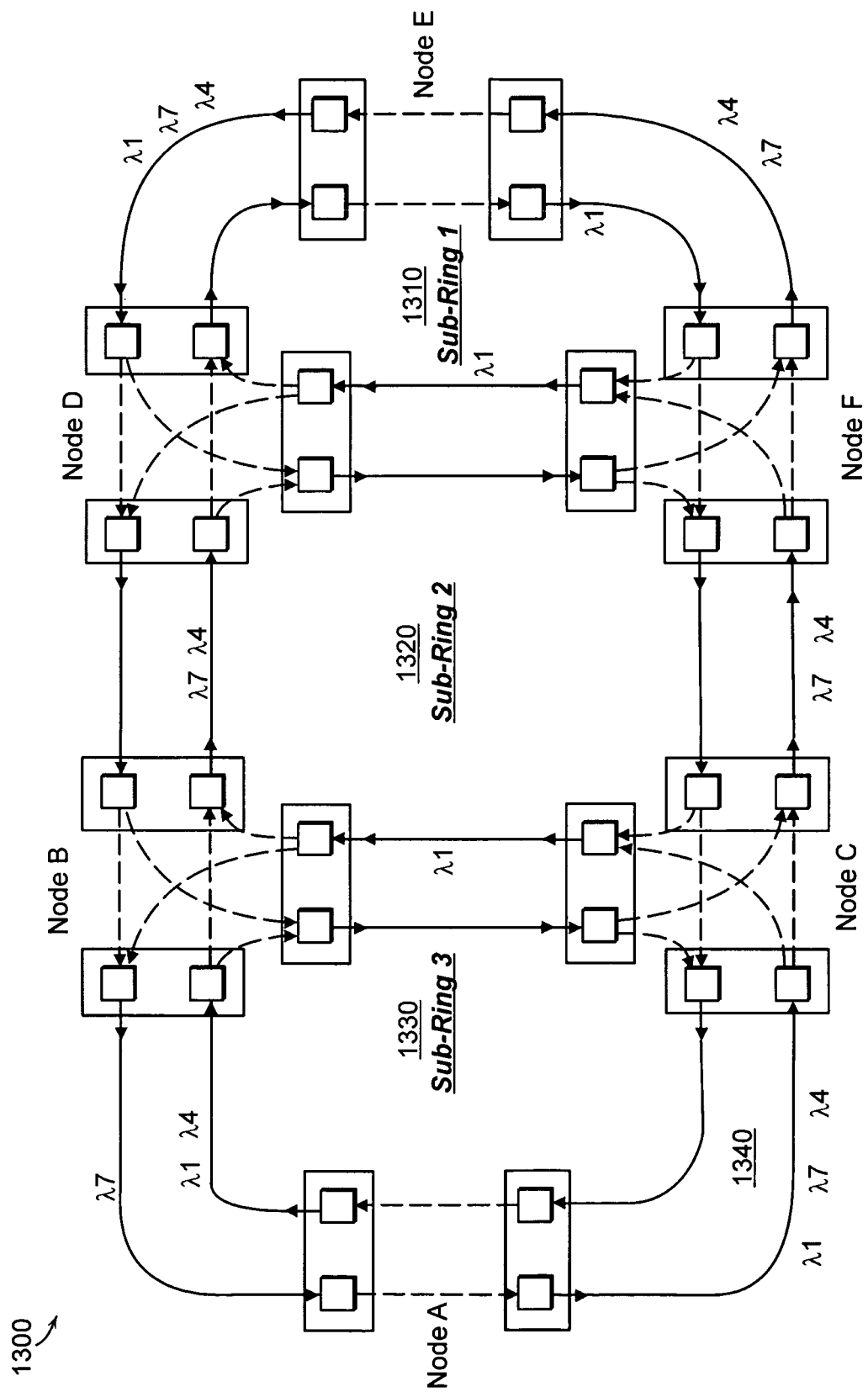
FIG. 13 is a network diagram of a network where nodes B, C, D, and F from FIG. 12 are replaced with 3-degree nodes.

FIG. 13 illustrates a network 1300 where nodes B, C, D, and F from FIG. 12 are is replaced with 3-degree nodes. In this embodiment, two "isolated" sub-rings are formed: Sub-Ring 1 1310 and Sub-Ring 3 1330. These sub-rings may be referred to as "isolated sub-rings" because they share no common ring sections. Another sub-ring, Sub-Ring 2 1320, is also formed. In FIG. 13, Sub-Ring 3 1330 includes the sub-ring formed by nodes A, B, and C; Sub-Ring 1 1310 includes the sub-ring formed by nodes D, E, and F; and Sub-Ring 2 1320 includes the sub-ring formed by nodes B, C, D, and F. Sub-rings that are isolated from one another (e.g., Sub-Rings 1 and 3) may use the same wavelengths to establish connections between the nodes of their associated sub-rings. For instance, in FIG. 13 a connection may be established between nodes D and E on Sub-Ring 1 1310 using wavelength number 1 ($\lambda 1$), while this same wavelength number 1 ($\lambda 1$) can simultaneously be used to establish a connection between nodes A and B on Sub-Ring 3 1330.

As an example of how the number of wavelengths may be reduced by utilizing the four 3-degree nodes, suppose that a network such as the network 1300 shown in FIG. 13 is used to establish fully protected bidirectional connections between every pair of nodes (e.g., using UPSR protection). As illustrated in Table 2 below, a total of twelve wavelengths may be used to establish all the connections. Therefore, three wavelengths are saved by using the 3-degree nodes shown in FIG. 13 (as compared to using only 2-degree nodes). In this example, Sub-Ring 1 and Sub-Ring 3 use three wavelengths in common, namely wavelength numbers 1, 2, and 3.

TABLE 2

| Connection | Wavelength Number | Ring |
| --- | --- | --- |
| A-B | $\lambda 1$ | Sub-Ring 3 |
| A-C | $\lambda 2$ | Sub-Ring 3 |
| A-D | $\lambda 4$ | Main Outer Ring |
| A-E | $\lambda 5$ | Main Outer Ring |
| A-F | $\lambda 6$ | Main Outer Ring |
| B-C | $\lambda 3$ | Sub-Ring 3 |
| B-D | $\lambda 7$ | Main Outer Ring |
| B-E | $\lambda 8$ | Main Outer Ring |
| B-F | $\lambda 9$ | Main Outer Ring |
| C-D | $\lambda 10$ | Main Outer Ring |
| C-E | $\lambda 11$ | Main Outer Ring |
| C-F | $\lambda 12$ | Main Outer Ring |
| D-E | $\lambda 1$ | Sub-Ring 1 |
| D-F | $\lambda 2$ | Sub-Ring 1 |
| E-F | $\lambda 3$ | Sub-Ring 1 |

Sub-Ring 1 1310 and Sub-Ring 3 1330 may use the same wavelengths for communications between their nodes because they are isolated from each other (e.g., wavelength number 1 ($\lambda 1$) is used for communications between both nodes A and B, and D and E). Sub-Ring 2 1320 may not use the same wavelengths as Sub-Ring 1 1310 or Sub-Ring 3 1330 because Sub-Ring 2 1320 shares network paths in common with Sub-Ring 1 1310 and Sub-Ring 3 1330 (e.g., the paths between nodes B and C, and the paths between nodes D and F). Instead, Sub-Ring 2 1320 must use wavelengths that are not used by either Sub-Ring 1 1310 or Sub-Ring 3 1330 (e.g., wavelength number 7 ($\lambda 7$) is used for communications between nodes B and D). Communications between nodes of different sub-rings (i.e., communications along a main outer ring 1340) must use wavelengths that are not used by any of the sub-rings (e.g., wavelength number 4 (λ4) is used for communications between nodes A and D).

Figure 14:
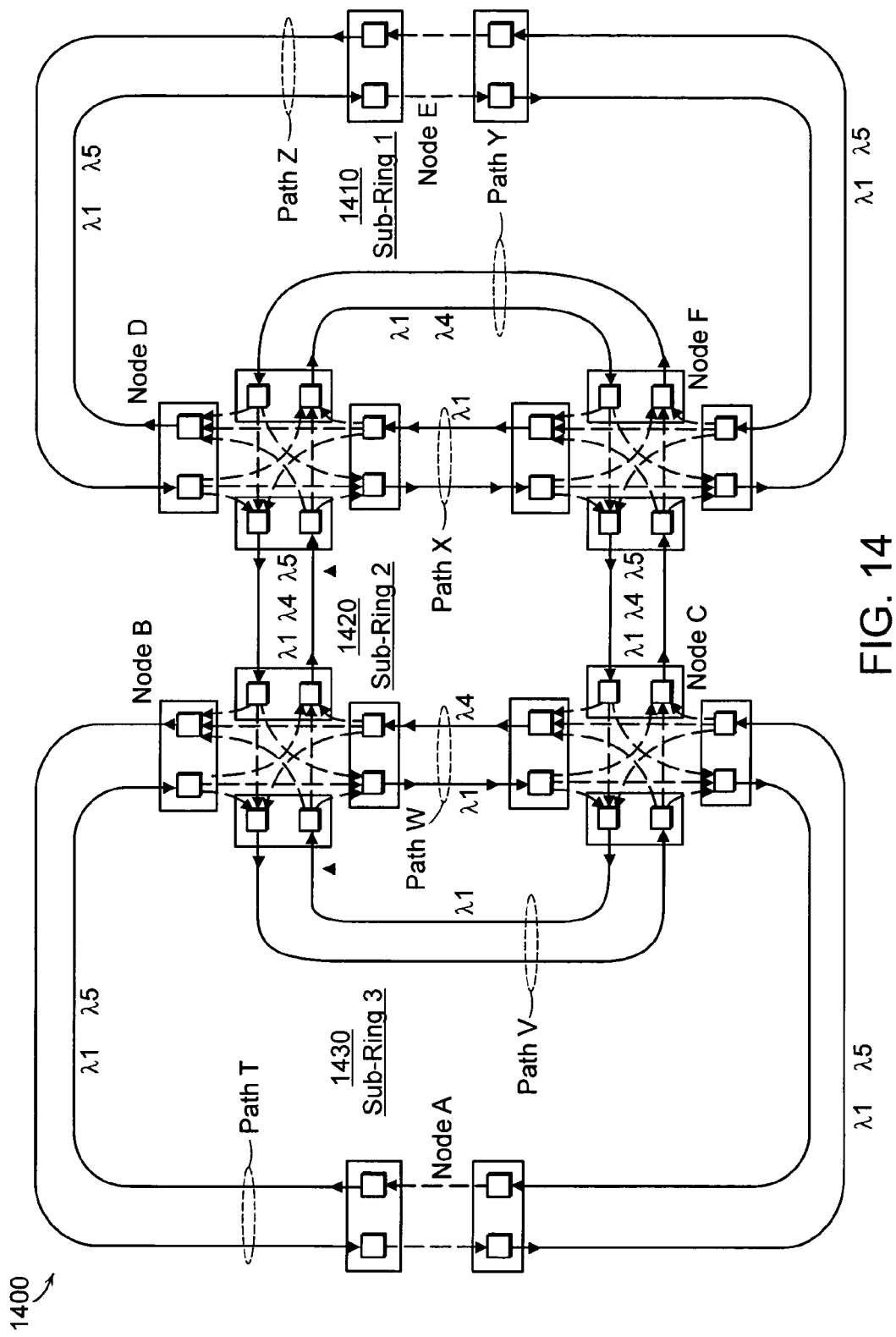
FIG. 14 is a network diagram of a network where nodes B, C, D, and F from FIG. 12 are replaced with 4-degree nodes.

FIG. 14 illustrates a network 1400 where nodes B, C, D, and F from FIG. 12 are replaced with 4-degree nodes with the extra degrees used to create two additional links using fiber pairs directed from node B to node C and from node D to node F. In this embodiment, three "isolated" sub-rings are formed: Sub-Ring 1 1410, Sub-Ring 2 1420, and Sub-Ring 3 1430. In FIG. 14, Sub-Ring 3 1430 includes the sub-ring formed by nodes A, B, and C using vertical fiber paths T and V. Sub-Ring 2 1420 includes a sub-ring formed by nodes B, C, D, and F using vertical fiber paths W and X. Sub-Ring 1 1410 includes a sub-ring formed by nodes D, E, and F using vertical fiber paths Y and Z.

As an example of how the number of wavelengths may be reduced by utilizing the four 4-degree nodes, suppose that a network such as the network 1400 shown in FIG. 14 is used to establish fully protected bidirectional connections between every pair of nodes (e.g., using UPSR protection). As illustrated in Table 3 below, a total of nine wavelengths may be used to establish all the connections. Therefore, six wavelengths are saved by using the 4-degree nodes shown in FIG. 14 (as compared to using only 2-degree nodes). In this example, Sub-Ring 1, Sub-Ring 2, and Sub-Ring 3 use three wavelengths in common, namely wavelength numbers 1, 2, and 3.

TABLE 3

| Connection | Wavelength Number | Ring |
|---|---|---|
| A-B | λ1 | Sub-Ring 3 |
| A-C | λ2 | Sub-Ring 3 |
| A-D | λ5 | Main Outer Ring |
| A-E | λ6 | Main Outer Ring |
| A-F | λ7 | Main Outer Ring |
| B-C | λ3 | Sub-Ring 3 |
| B-D | λ1 | Sub-Ring 2 |
| B-E | λ8 | Main Outer Ring |
| B-F | λ2 | Sub-Ring 2 |
| C-D | λ3 | Sub-Ring 2 |
| C-E | λ9 | Main Outer Ring |
| C-F | λ4 | Sub-Ring 2 |
| D-E | λ1 | Sub-Ring 1 |
| D-F | λ2 | Sub-Ring 1 |
| E-F | λ3 | Sub-Ring 1 |

Because each sub-ring is isolated from the other sub-rings, the same wavelengths may be used in each of the sub-rings (e.g., wavelength number 1 (λ1) may be used for communications between nodes A and B, nodes B and D, and nodes D and E). Sub-Ring 2 1420 uses an additional wavelength because it includes four nodes (e.g., wavelength number 4 (λ4) may be used for communications between nodes C and F). It should be noted that λ4 can be reused in sub-ring 3 in order to transport additional traffic between two nodes on sub-ring 3. Similarly, λ4 can be reused in sub-ring 1 in order to transport additional traffic between two nodes on sub-ring 1. Communications between nodes of different sub-rings must use wavelengths that are not used by any of the sub-rings (e.g., wavelength number 5 (λ5) is used for communications between nodes A and E).

Additional isolated sub-networks may be created by adding to the network 1400 an even number of paths that couple at least two of the multi-degree nodes. For example, in FIG. 14, an additional isolated sub-ring may be created with an addition of two paths that couple any two of the 4-degree nodes. Both of the newly coupled nodes thus become 6-degree nodes.

FIGS. 15-18 illustrate how multi-degree nodes may be added to an existing, single ring, DWDM network to create additional sub-ring networks to reduce the number of wavelengths needed for communications in the network.

Figure 15:
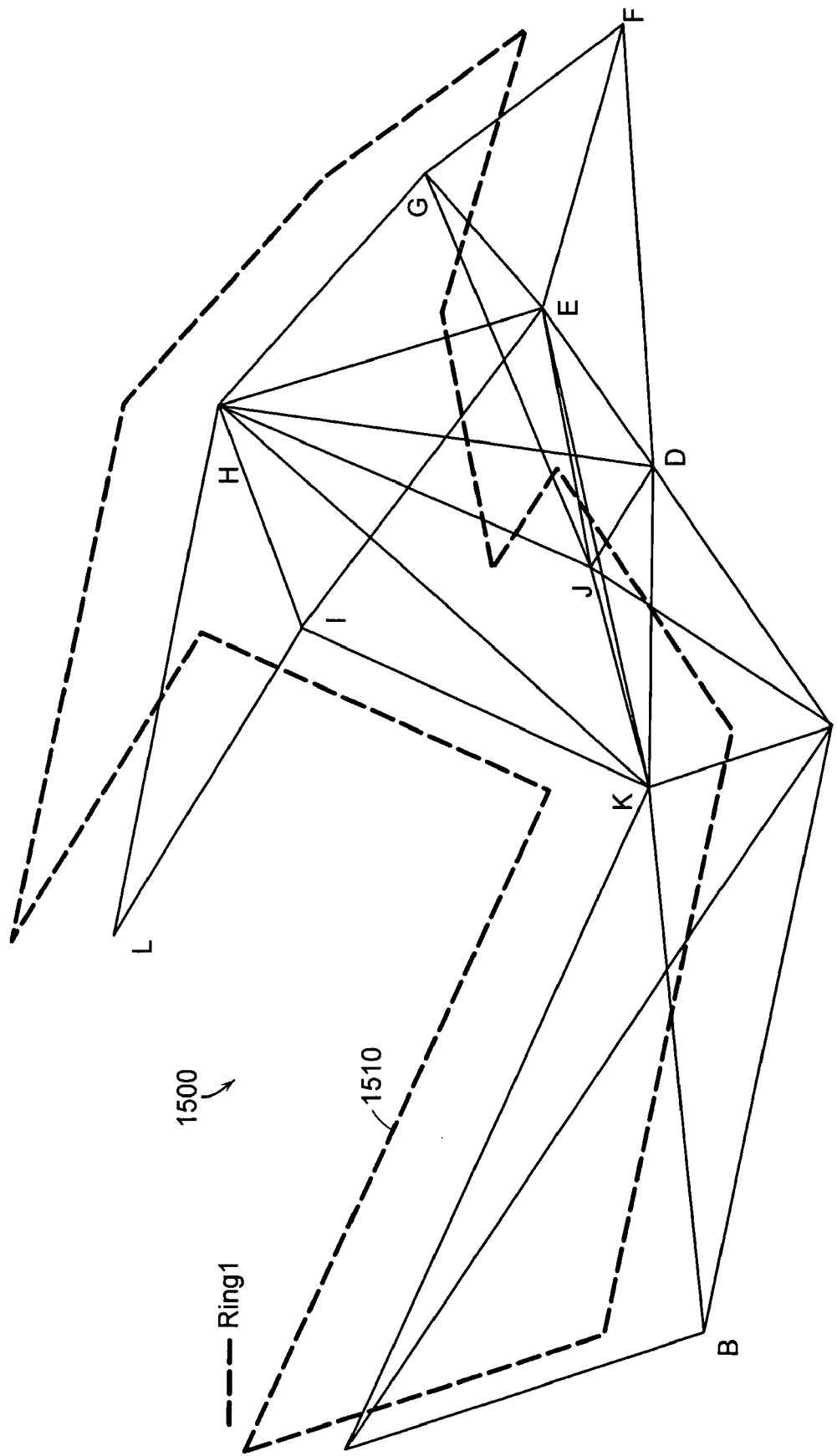
FIGS. 15-18 are network diagrams illustrating how multi-degree nodes may be added to an existing, single ring, DWDM network to create additional sub-network rings that reduce the number of wavelengths used for communications in the network.

FIG. 15 is an illustration of an existing, single ring, DWDM network 1500 containing nodes A-L. Many wavelengths are needed for communications between the nodes. A thick dashed line illustrates an exemplary ring 1510 within the network.

Figure 16:
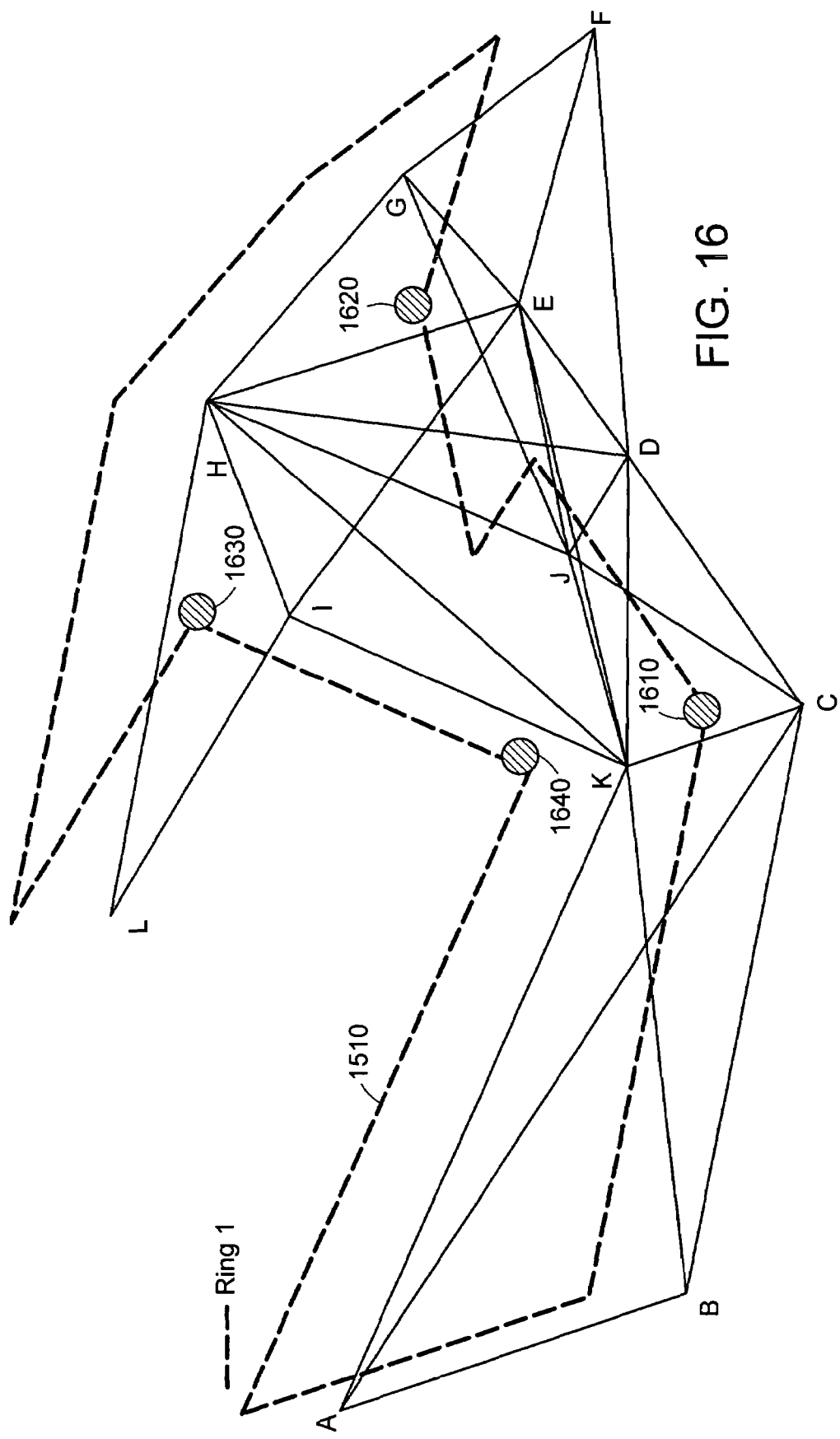
Figure 17:
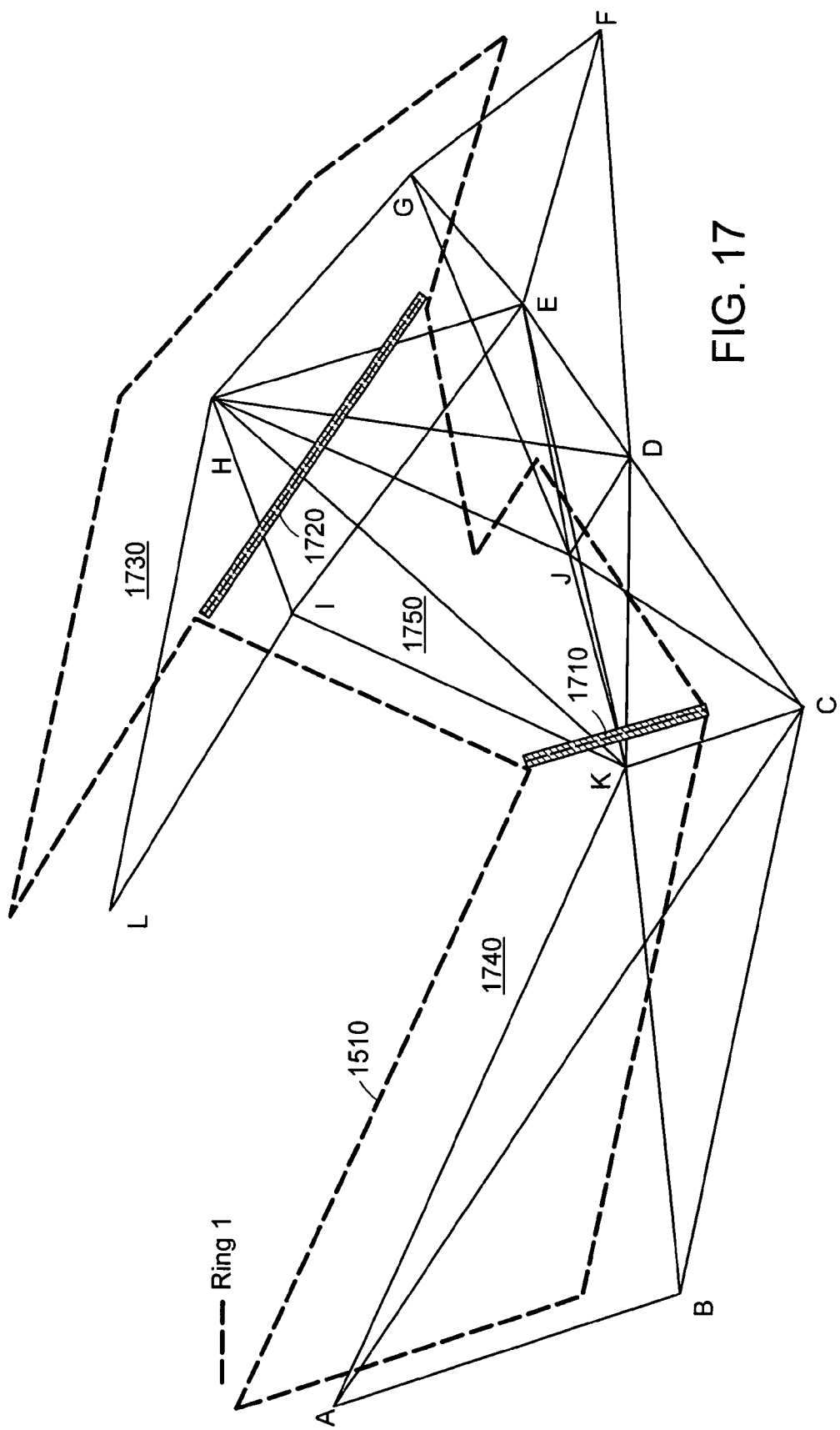

FIG. 16 illustrates a designation 1610, 1620, 1630 and 1640 of nodes C, E, I, and K, respectively, in Ring 1 that are replaced with 4-degree nodes FIG. 17 illustrates an addition of "cut-through" fibers 1710, 1720 connecting the new 4-degree nodes C, E, I, and K. Two fiber pairs may be used for each cut-through to prevent wavelength blocking by creating isolated sub-networks. The addition of the cut-throughs creates three, new, isolated sub-network rings 1730, 1740, 1750.

Figure 18:
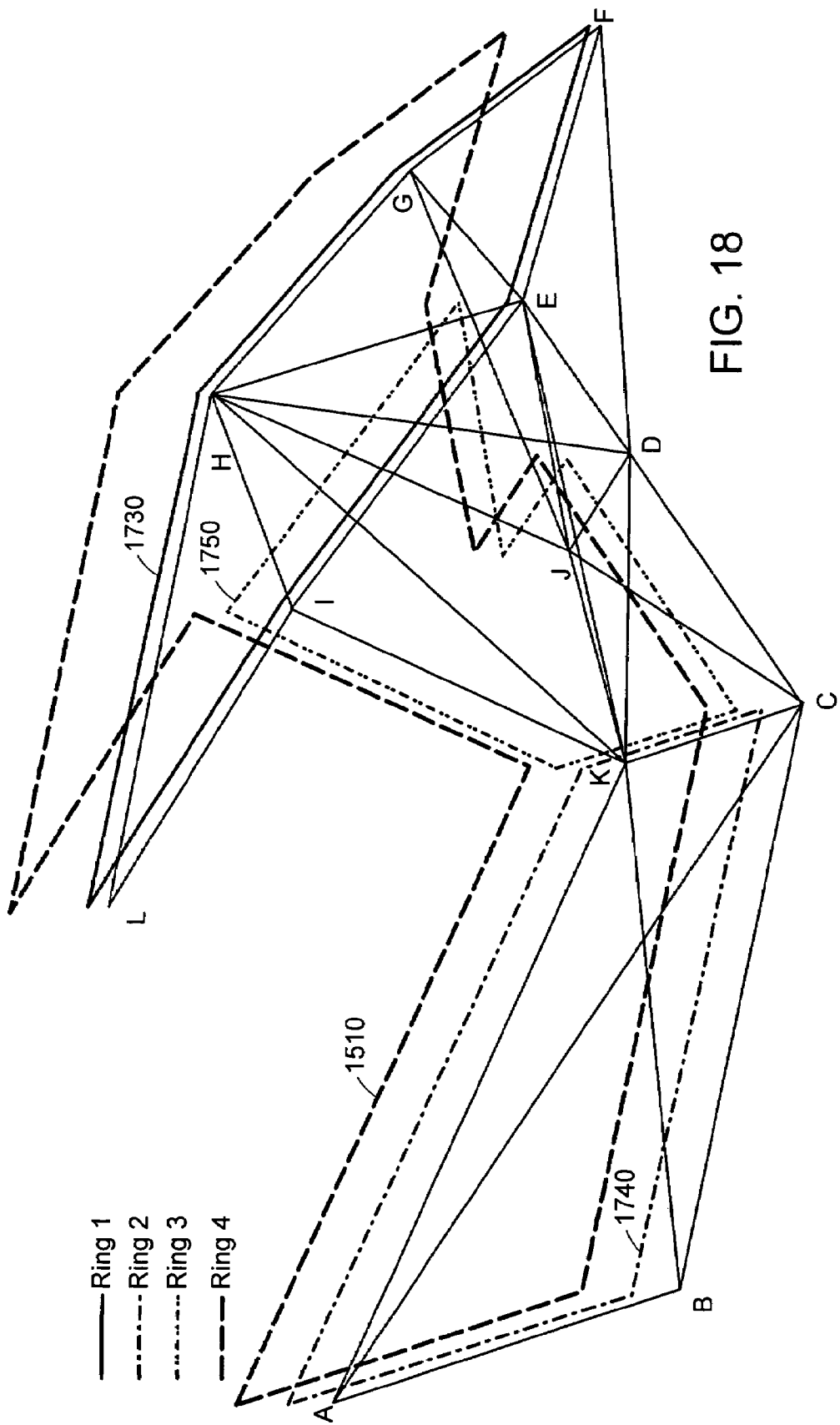

FIG. 18 is a perspective of the resulting DWDM network that contains a total of four rings. Rings 1-3 1730, 1740, 1750 are the newly created rings, while Ring 4 1510 is the original. Network traffic may be routed so that each demand traverses only one ring. This reduces the number of wavelengths that are needed for communications in the network.

In the description above, for purposes of explanation, specific nomenclature is set forth to provide a thorough understanding of the embodiments of the present invention. However, it will be apparent to one skilled in the art that specific details in the description may not be required to practice the embodiments of the present invention. In other instances, well-known components are shown in block diagram form to avoid obscuring embodiments of the present invention unnecessarily.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network, comprising:
   at least four network nodes each coupled to at least four network paths, at least four of the network paths used to couple the at least four network nodes; and
   at least three isolated sub-networks each including different ones of the network paths and using at least one wavelength in common, at least two of the sub-networks each including at least two of the at least four network nodes that others of the at least two sub-networks do not include, and at least one of the sub-networks including at least four of the network nodes.

2. The network of claim 1 wherein at least two of the at least four network nodes are coupled by an additional even number of network paths, each pair of the additional network paths forming an additional isolated sub-network.

3. The network of claim 1 wherein the at least four network nodes are reconfigurable in an optical domain.

4. The network of claim 1 wherein at least one of the network paths includes multiple network nodes or sub-networks.

5. The network of claim 1 wherein at least one of the at least four network nodes includes at least one add/drop port.

6. The network of claim 1 wherein the sub-networks are ring networks, mesh networks, or a combination of ring networks and mesh networks.

7. The network of claim 1 wherein at least two of the sub-networks use at least one wavelength, in addition to the at least one wavelength in common, supporting communications between nodes of the at least two sub-networks.

8. A method of supporting communications in a network including four network nodes each being coupled to four network paths, the four network nodes being coupled by at least four of the network paths, the method comprising:
    carrying first communications on at least one given wavelength in a first isolated sub-network of the network, the first communications being carried through two of the four network nodes and through a first pair of the network paths;
    carrying second communications on the at least one given wavelength in a second isolated sub-network of the network, the second communications being carried through the other two of the four network nodes and through a second pair of the network paths;
    carrying third communications on the at least one given wavelength in a third isolated sub-network of the network, the third communications being carried through the four network nodes and through four of the network paths other than the first and second pairs of network paths; and
    carrying fourth communications on at least one wavelength, in addition to the at least one given wavelength, between two of the isolated sub-networks, the first, second, third, and fourth communications being concurrently carried in the network.

9. A method of supporting communications in a network, comprising:
    carrying first communications on at least one given wavelength in a first sub-network of the network, the first communications being carried through at least two network nodes coupled by at least four network paths and through at least two of the at least four network paths;
    carrying second communications on the at least one given wavelength in a second sub-network of the network, the second communications being carried through the at least two network nodes and through at least two other paths of the at least four network paths;
    carrying third communications on at least one wavelength, in addition to the at least one given wavelength, between the first sub-network and the second sub-network, the first, second, and third communications being concurrently carried in the network; and
    carrying additional communications through the at least two network nodes and through at least two additional paths defining a third sub-network, the additional communications being carried on the at least one given wavelength in the third sub-network.

10. The method of claim 8 further including carrying additional communications through an additional even number of network paths coupled to two of the network nodes, each pair of the additional network paths forming an additional isolated sub-network.

11. The method of claim 8 further including optically reconfiguring the network paths.

12. The method of claim 8 wherein carrying first communications includes carrying the first communications through multiple network nodes or sub-networks.

13. The method of claim 8 wherein carrying first communications includes adding or dropping wavelengths to or from the first sub-network.

14. The method of claim 8 wherein carrying first communications includes carrying the first communications in a sub-network that is a ring network, a mesh network, or a combination of ring networks and mesh networks.

15. A network, comprising:
    at least two network nodes each coupled to at least four network paths, at least two of the at least four network paths coupling the at least two network nodes;
    at least two isolated sub-networks each including at least two of the network nodes, the at least two isolated sub-networks using at least one wavelength in common; and
    at least two additional network nodes each coupled to at least four network paths, the at least two additional network nodes coupled to the at least two network nodes by at least two of the network paths and coupled by at least two others of the network paths, at least four of the network paths (i) interconnecting the at least two additional network nodes with the at least two network nodes and (ii) defining a third isolated sub-network.

16. The network of claim 15 wherein the at least two network nodes are coupled by an additional even number of network paths, each pair of the additional network paths forming an additional isolated sub-network.

17. The network of claim 15 wherein the at least two network nodes are reconfigurable in an optical domain.

18. The network of claim 15 wherein at least one of the at least two network nodes includes at least one add/drop port.

19. The network of claim 15 wherein the sub-networks are ring networks, mesh networks, or a combination of ring networks and mesh networks.

20. The network of claim 15 wherein at least two of the sub-networks use at least one wavelength, in addition to the at least one wavelength in common, supporting communications between nodes of the at least two sub-networks.

21. A network, comprising:
    four network nodes each coupled to four network paths and coupled by four of the network paths; and
    three isolated sub-networks each including different ones of the network paths and using at least one wavelength in common, two of the sub-networks each including two of the four network nodes that the other sub-network does not include, and one of the sub-networks including the four network nodes.

22. A method of supporting communications in a network having two-degree nodes coupled by network paths, the method comprising:
    replacing four two-degree nodes of the network with four four-degree nodes;
    coupling two pairs of the four-degree nodes each with two additional network paths to create first, second, and third isolated sub-networks;
    carrying first communications on a given wavelength in the first sub-network;
    carrying second communications on the given wavelength in the second sub-network; and
    carrying third communications on the given wavelength in the third sub-network, the first, second, and third communications being concurrently carried in the first, second, and third sub-networks.

* * * * *

UNITED STATES PATENT AND TRADEMARK OFFICE
CERTIFICATE OF CORRECTION

PATENT NO.        : 7,627,245 B2                                          Page 1 of 1
APPLICATION NO. : 11/227308
DATED             : December 1, 2009
INVENTOR(S)       : Jenkins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 843 days.

Signed and Sealed this

Second Day of November, 2010

David J. Kappos
*Director of the United States Patent and Trademark Office*